United States Patent [19]
Crete et al.

[11] 3,873,200
[45] Mar. 25, 1975

[54] PHOTOGRAPHIC COLOR ENLARGING SYSTEM

[75] Inventors: Darrel R. Crete, Fair Oaks; Kenneth A. McDonald, West Sacramento, both of Calif.

[73] Assignee: Charles A. Crete, Marysville, Calif.

[22] Filed: Sept. 6, 1973

[21] Appl. No.: 394,732

[52] U.S. Cl................. 355/38, 356/188, 356/195
[51] Int. Cl. ........................................ G03b 27/76
[58] Field of Search ....... 355/38; 356/178, 188, 195

[56] References Cited
UNITED STATES PATENTS

| | | | |
|---|---|---|---|
| 3,576,370 | 4/1971 | Kuhn et al. | 355/38 |
| 3,672,768 | 6/1972 | Schaub et al. | 355/38 |
| 3,724,947 | 4/1973 | Paulus | 355/38 |

*Primary Examiner*—Richard A. Wintercorn
*Attorney, Agent, or Firm*—Townsend and Townsend

[57] ABSTRACT

A self-contained photographic enlarging system for making a color print from a conventional color negative wherein a sample from the source of printing light is taken from within the enlarger, after passage through the negative and before projection through the projection lens and is converted into three electrical color signals respectively representative of the cyan, magenta and yellow colors in the negative to be enlarged. Each of said respective color signals thereafter is combined with a reference voltage pre-established as being of an absolute magnitude equal to the desired color signal for providing the correct printing for that color in the negative from which the sample was taken to produce a color error signal of a magnitude equal to the differences between the color signal voltage for that color and the reference voltage, and of a polarity of the larger of the two. Said error signals are automatically applied in the system, to alter the proportion of each color in the printing light before its passage through the negative, to make a print in which the colors are balanced.

8 Claims, 4 Drawing Figures

PHOTOGRAPHIC COLOR ENLARGING SYSTEM

SUMMARY

Reference to the present system as being a "self-contained" photographic enlarging system means that the color light rays from the source of printing light within the enlarger after passage through the color negative and before projection to the paper are analyzed and corrected to make a correctly color-balanced print when projected onto the printing paper, and thereafter projected onto said paper. These steps are simultaneous for the three primary colors.

In the present system, as in those heretofore used, it is essential to make one or more test prints to determine the balance of the batch of color paper to be used, which is normally done with a standard or control negative. The color balance of each batch of paper will usually vary.

Heretofore, in making enlarged color prints from color nagatives, a light source separate from the enlarger light may be used in analyzing a negative. From this analysis different manually actuated controls are manipulated to provide the filtration required to provide a color balance that will result in a print of the best overall color possible in the light of the color quality of the negative.

In the absence of the expensive negative analyzers, such as the video color analyzers or others such as the densitometer and photometer, each of which may utilize a different light source than is used in the color enlarger, heretofore many prints may be required before the properly balanced color print is made.

In the present system the printing light source is used for analysis, correction and printing, therefore variables between the printing light and the light for the analysis do not exist, and there is no loss in time in converting the readings of the analyzer to the enlarger, nor is there any room for error in transmittal of data from an analyzer to the enlarger or other control means.

Furthermore, the present system is a light dependent system as distinguished from a time dependent system.

In the time dependent system, the quantities of red, blue and green light from the negative in the enlarger are fixed, and rejection filters are inserted into the light beam when the system determines that the time for each given color has been reached, whereas the present system operates to balance the light to the negative for the necessary quantities of red, blue and green light to make a correctly color balance print, for a given total time.

One of the objects of the invention is the provision of an improved enlarging system over the conventional enlarging systems, in that the rays of printing light within the enlarger from each negative are analyzed and corrected without transposition of data from an analyzer using a light from a different source.

Another object of the invention is the provision of a self-contained enlarger system that includes the enlarger, and in which the printing light, before projection from the enlarger, and after passage through a color negative, is corrected to establish a color balance in the amounts of the several different color rays projected onto the paper for making a correct color print from a negative.

A still further object of the invention is the automatic combination of three color filters of the three subtractive colors, cyan, magenta and yellow positioned within the enlarger between the source of printing light and the negative, for simultaneous passage of the printing light therethrough, and the intensity of the light passed from each filter to the negative is controlled by error voltages respectively derived from each of the red, green and blue rays of enlarging light after passage through the negative and before projection combined with pre-established voltages of correct magnitude for making a correct color balanced print from said negative.

Other objects and advantages will appear in the description and drawings.

DETAILED DESCRIPTION

Figure 2:
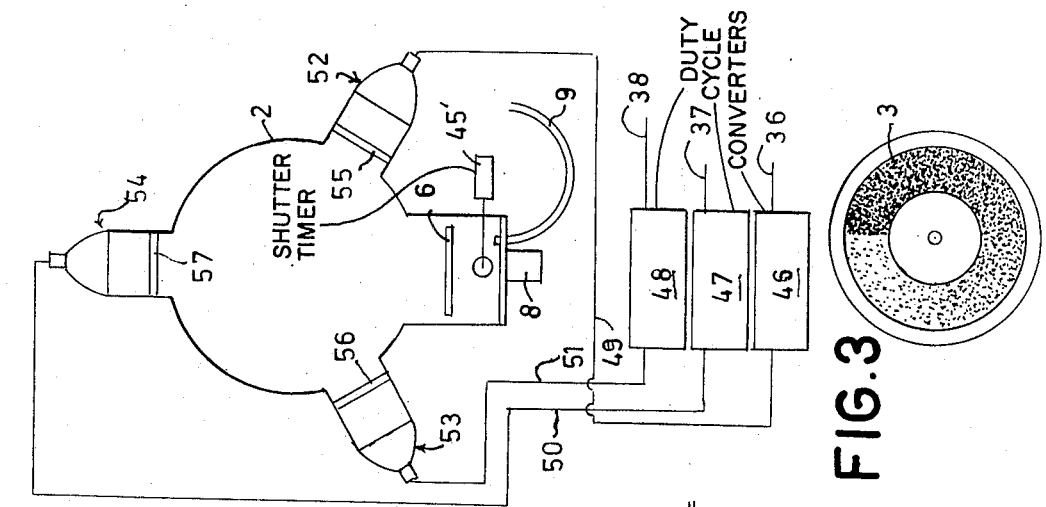
FIG. 2 is a simplified schematic view of a modification applicable to the system of FIG. 1 for electronically controlling the intensities of the enlarging light for the several colors.
Figure 1:
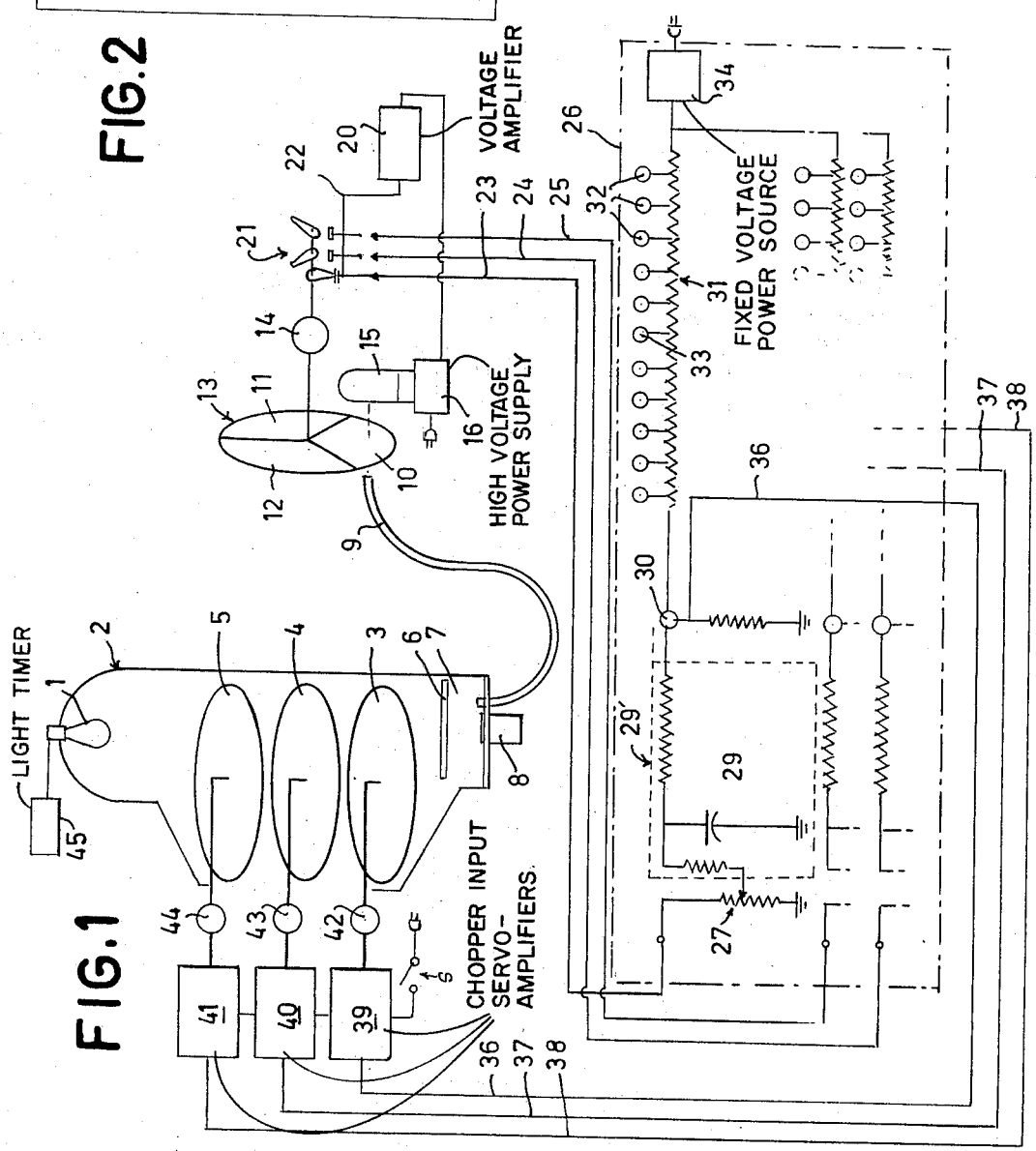
FIG. 1 is a simplified schematic view of an electromechanical system including the combination of elements of the system.

FIG. 1 is a simplified schematic view of an electromechanical control system in which with the exception of the specific light source and color filters in the enlarger lamp housing, and the final connection between the control panel and the light source, the control systems are identical. FIG. 2 schematically shows the portions that distinguish the electromechanical system of FIG. 1 from the electronic system.

Electro-Mechanical System

Figure 3:
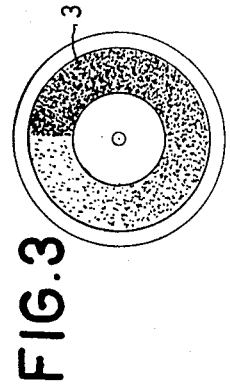
FIG. 3 is a plan view of one of the variable color filters in the enlarger of FIG. 1, the stippled portion representing the variable saturation of each filter, and not the color.

White light rays from a source 1 (FIG. 1) within a lamp housing 2 are filtered through variable saturation yellow, magenta and cyan filters 3, 4, 5, the stippled area in FIG. 3 indicating the area in each filter through which the light rays pass. These filters are simultaneously separately driven, as will later be explained.

The light rays so filtered are passed through a conventional color negative at 6 (FIG. 1) and into the space 7 between the negative and the projection lens 8.

A uniform sample of the light passing into space 7 is conducted therefrom through a light wire 9 arranged as shown and described in U.S. Pat. 3,685,901 of Aug. 22, 1972, issued to Darrel R. Crete. This light may be called "spill" light as it is only a small fraction of the light that passes from space 7 to and through the projection lens and to the printing paper, and it represents the sum of the red, green and blue colors in the rays that have passed through the color negative.

The aforesaid spill light from the carrier 9 is projected through red, green and blue filters 10, 11, 12 (FIG.1) of a disc generally designated 13. Said disc is rotated at a uniform speed by a motor 14. The rays may be projected through a turret-type shell enclosing the photomultiplier tube and having red, green and blue filters equally spaced therearound, substantially as disclosed in the aforesaid patent, and rotated in the same manner as the disc. The rays so projected are directed onto a conventional photomultiplier tube 15 having a high voltage power supply 16, and are converted into three groups of pulsating D.C. voltages, respectively representative of the red, green and blue colors. Each D.C. pulse of each of the three groups is proportional to the amount of spill light passing through the filter associated therewith.

The pulsating D.C. voltages from the photomultiplier tube are amplified by an amplifier 20 and are conducted to a switch assembly, generally designated 21, which is driven in synchronism with the red, green and blue filters by motor 14. The switch assembly may be of any suitable type for connecting the conductor 22 from the amplifier 20, in succession, with three conductors 23, 24, 25, to separate the D.C. pulses from the photomultiplier tube into three groups corresponding to the colors of the three filters 10, 11, 12.

The semi-schematic view of the switch assembly in FIG. 1 is representative of cam actuated switches, it being understood that the switches automatically return to open positions, and each is closed during a uniform time interval sufficient to effect the desired separation of pulses.

The groups so separated are separately conducted through said conductors 23, 24, 25 to a control panel 26, indicated in broken lines in FIG. 1.

As the control for each group is the same, only one is illustrated in detail in FIG. 1. Conductors 23, 24, 25 may represent the pulses of the red, green and blue colors.

The pulses of one group, for example, pass through a potentiometer 27 (FIG. 1) adjustable by a manually operated knob 28 (FIG. 4), and from said potentiometer the pulses are conducted through an integrating network 29 that is indicated within the broken line box 29' (FIG. 1) to produce a smooth D.C. voltage of an amplitude proportional to the magnitude of its generating color in the spill light. Each voltage so produced will hereafter be referred to as a color signal.

It is to be understood that several of said networks may be required to effect the necessary integration, hence the word "network" is to be broadly interpreted as being one or several of the elemental networks indicated.

Each of the potentiometers determines the proportion of color signal magnitude to its photomultiplier pulse magnitude, and functions as a "color gain" control, the purpose being to calibrate the system to match the color sensitivity of the printing paper being used. In this sense the color gain controls are analogous to the conventional "basic pack" filtration filters ordinarily inserted into a lamp housing.

In the present instance, when a print is made from a standard reference negative and examined, the operator may readily adjust the potentiometers to rectify any color imbalances in the print due to differences in the emulsions of the printing paper, and the potentiometers remain in the adjusted positions for that particular batch of paper.

Each color signal from network 29 is conducted to a separate summing junction 30 where it is added to a reference voltage of opposite polarity obtained from an operator-controlled step attenuator 31 for that color, which reference voltage has been pre-established with the "normal" button depressed as being of the absolute magnitude equal to the desired color signal for providing the correct printing light for that color in the negative that is in the enlarger.

A fixed voltage from a power source 34 provides the input or reference voltage to each attenuator 31 to be conducted by the latter to each summing station 30.

Each of the three operator-controlled color attenuators 31 is selectable by separate manually actuable elements 32 (FIGS. 1, 4) that are identified as plus and minus units of color saturation, and that are respectively positioned at opposite sides of a normal attenuator position 33.

The addition of the color signal voltages and the attenuator output voltages at the summing junction 30 creates a color error signal voltage in line 36 of a magnitude equal to the difference between the two voltages, and of a polarity of the larger of the two.

The separate color signals are then separately conducted through lines 36, 37, 38 and are respectively amplified (FIG. 1) by conventional chopper input servo-amplifiers 39, 40, 41 to a magnitude sufficient to drive phase-sensitive servo-motors 42, 43, 44 respectively coupled to their variable saturation complementary color filters 3, 4, 5 in the lamp housing 2, the motor torque of each being proportional to the error signal amplitude, and its rotational direction being dependent on the polarity of the error signal. The overall effect is to alter the proportion of the given color in the lamp housing light until its fraction available in the spill light develops a color signal at the summing station 30 equal in absolute magnitude to the reference signal from attenuator 31 at which time the error signal becomes zero and the motor stops driving.

The above operation is simultaneous for the three colors, and it not only effects color balances but at the same time establishes density, since density is the summation of equal parts of red, green and blue.

Inasmuch as the light sensed for control is downstream of the negative, and is the same light used to make the print, it is seen that any negative of any color balance within the range of the system will always be compensated for until the pre-set color balance is established by the color gain controls is met, and when these controls are adjusted to produce a satisfactory print from a standard negative on a given emulsion paper, a wide range of negatives of different base material and color bias will produce a correspondingly satisfactory print, and the various attenuator networks may be employed to vary the color balance and density of the print to be made so as to achieve a result consistent with operator judgement.

In operation, a standard or reference color negative is first positioned in the enlarger for each new batch of printing paper. Such a negative is one that has been properly exposed and properly processed, and that normally contains a relatively wide range of readily identifiable colors. A test print is made from this reference negative.

From an examination of the test print, or prints, if more than one is required, the system is calibrated through adjustment of the potentiometers to rectify any inherent imbalance in the color sensitivity of the emulsions on the paper. The potentiometers will then remain in their adjusted positions for any prints made on the paper of that batch from any color negative.

The reference negative is then replaced by the color negative from which the final print is to be made.

An operator reasonably skilled in making color prints can, and usually does, examine the color negative and subjectively judges from its appearance the adjustments, if any, that may be required in attenuator 31 to enhance the print, and such adjustments are made by manual selection of one of the elements 32 at one side or other of the "normal" element 33 for each color.

After proper adjustments have been made, the enlarging light or lights may be turned on and the power applied to the servo-motors through switch S (see FIG. 1). The motors will continue to drive the filters as long as there is an error voltage, and upon the voltage at each summing junction becoming equal the error signal for each color will cease to actuate the servo-motor associated therewith, and the graduated filter driven by such motor will be in the proper position for making a balanced print. When all filters are stationary, power to the servo-motors is turned off, and the print is made by actuation of the dark shutter or a switch in the lamp circuit in the conventional manner.

The same routine may be followed with respect to a system using the lamps 52, 53, 54 and the controllers 46, 47, 48 instead of the servo-amplifiers, servo-motors and rotating filter discs 3, 4, 5.

here again the error signals are employed as the dependent variable to effect the properly color balanced printing light.

In FIG. 1 an outside timer 45 is indicated for actuating a conventional timer-controlled switch in the lamp circuit for controlling the exposure time.

Figure 4:
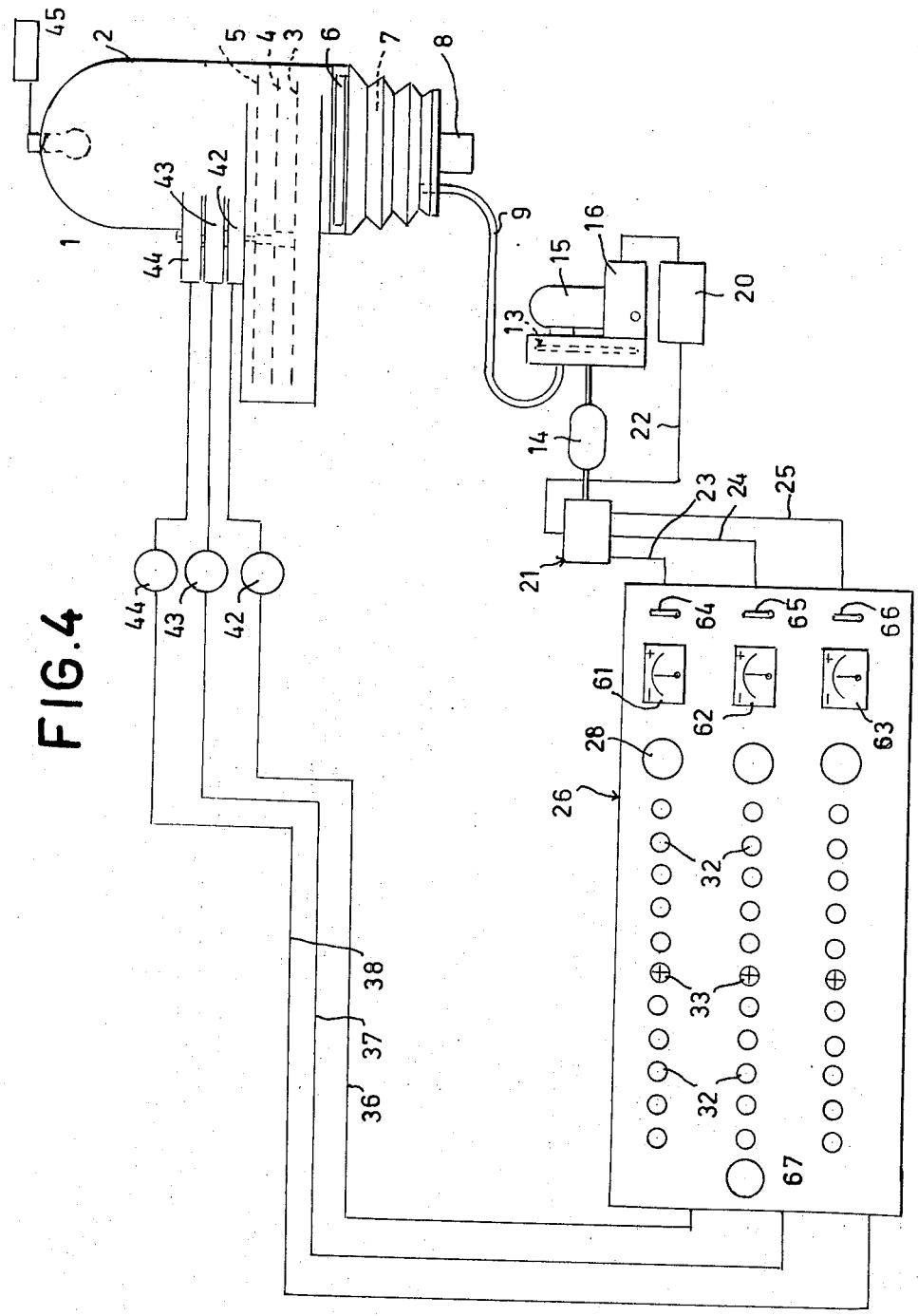
FIG. 4 is a semi-diagrammatic view in which the detailed circuit in FIG. 1 is deleted, and the various elements of the combination are diagrammatically shown, including the control box on which optional control features and meters are indicated.

In FIG. 4 the timer 45' controls the shutter, which may be in the optical system, for controlling the exposure time. Obviously, the exposure time can be controlled by any of the conventional ways in the present system.

Electronic System

Each error signal 36, 37, 38 (FIG. 2) is used to establish the average power output of a controller 46, 47, 48, said power output then being applied through conductors 49, 50, 51 to lamp 52, 53, 54. Each lamp is respectively provided with a filter 55, 56, 57 of a color complementary to the "color" of the error signal. In the example, the filters would be cyan, magenta and yellow, as the color signals from the photomultiplier were generated from red, green and blue lights.

Controllers 46, 47, 48 may be conventional duty cycle converters or any other suitable means for converting the D.C. error signals to the required power level and establishing an inverse relationship between each error signal and the light from each lamp.

For any error signal there will be a corresponding average quantity light from one of the lamps. Said light, by system design, increases in quantity with a decrease in error signal, and decreases in quantity with an increase in error signal. For a given reference voltage the color error signal is dependent upon the color signal, which in turn, is dependent upon the light, and since it is specified that there is an inverse relationship between the error signal and the light from the lamp, this system will "drive" to balance similar to the servo-motor system of FIGS. 1, 4, except that there will always be that residual error signal necessary to maintain the lamp at the required quantity of light. This residual error signal can arbitrarily be made small to be well within the design accuracy of the overall system by increasing the gain of the controllers.

The lamps 52, 53, 54 may each be a pressurized gas arc lamp of the VARIAN type made by Varian Associates, Palo Alto, Calif. Each of the filters may be an integrated dichroic filter.

As lamps of this type are quite desirable and can be used in any position, and in small sizes are capable of delivering a peak beam of 200,000 candle power at 150 watts, it is apparent that their use in the present system is economical both as to power and time. The present invention is not necessarily restricted to this type lamp.

In its broadest aspect, the method generic to the disclosures hereinbefore described, is one in which rays of the enlarging light, whether from one or several lamps, are transmitted through a color negative from which a print is to be made, and a small sample of said enlarging light, after such transmittal, and before projection onto the printing paper, is diverted from the remainder of the rays to be projected for printing, and a derived D.C. voltage color signal is generated from each of the red, green and blue rays of said sample. Each such derived voltage is inversely proportional to the saturation of the complementary color in the negative, and each is used to control the automatic operation of the system until the absolute magnitude of that voltage is equal to the magnitude of the color signal required to produce the correct light intensity for its complementary color in said negative, and thereby the intensity of the remainder of the enlarging light for each color is automatically modified proportional to said voltage for making a correctly balanced color print from said negative, and the print is then made.

This method not only applies to the making of color prints from negatives that are substantially out of color balance, but the same steps are employed in calibrating the system from a standard reference negative where there are variations in the sensitivities of the several emulsions on the printing paper.

FIG. 4 includes as an optional feature in the system, meters 61, 62, 63 for color saturation and a meter 67 for density, which will show the deviation in standard units between the negative in the enlarger and would indicate to the operator the attenuator control elements 32 which may require selection and actuation to override the automatic balancing of the system. Switches 64, 65, 67 are actuatable to select the range of meters 61–63. Also included is a "density" attenuator 67 affording a means of changing all three color reference voltages proportionally, thus effecting an intensity change in the light and a subsequent density change in the print.

We claim:

1. In a system for making enlarged color prints from color negatives that includes the combination of an enlarger having a source of white printing light and a projection lens; an enclosed passageway between said source and said lens for passage of the light from said source to said lens for projection from the latter; negative holder in said passageway spaced between said source and said lens for supporting a color negative in a position for transmitting therethrough light from said source to said lens; and color correction filters between said source and said negative for correcting color imbalance in the cyan, magenta and yellow colors in said negative:

a. generating means for generating first voltage color signals respectively proportional to the saturation of the colors complementary to the red, green and blue colors in a color negative when the latter is in said position in the enlarger;
b. a source of a second voltage of opposite polarity to said first voltage color signals;
c. means for establishing from said second voltage separate reference voltages respectively of absolute magnitudes equal to the voltage color signal required for the correct printing light for each of the aforesaid colors in said negative;
d. means for combining each of said reference voltages with the first voltage for the corresponding color to form an error voltage signal for each color of a magnitude equal to the difference between the reference voltage and the first voltage for each color, having the polarity of the greater voltage;
e. electrically actuatable control means for controlling the intensities of the light rays transmitted from said source to a color negative in said holder; and
f. means operatively connecting said error signals with said control means for altering the intensities of the rays of printing light transmitted to the color negative for passage through the latter when the latter is in said holder, proportional to the magnitudes of said error voltage signals, whereby the printing light projected through said negative and lens will make a print in which the color is correctly balanced.

2. In the combination as defined in claim 1:
g. means for diverting a small sample of the light from the space in said passageway between said negative holder and said lens and for conducting the sample to said generating means for generating said first voltage color signals from said sample.

3. In the combination as defined in claim 1:
g. said error signal voltages each being in a separate electrical circuit;
h. said control means including rotatably supported cyan, magenta and yellow color filters of graduated saturations in said passageway between said source and said negative holder; and
i. a servo-motor connected with each filter for separately rotating each filter at a uniform rate and for stopping said rotation when the said error voltage signal and said reference voltage for each color are equal.

4. In the combination as defined in claim 1:
h. the source of said printing light comprising three separate electric lamps and electrical circuit connecting the error signal voltages with each lamp;
i. a cyan, magenta and yellow color filter stationarily positioned across the light rays from each source;
j. a controller in each of said electrical circuits for automatically increasing or decreasing the light output of each lamp in inverse proportion to the magnitude of the error signal whereby the light output will decrease in quantity with an increase in said error signal voltage and will increase in quantity with a decrease in said error voltage until said error signal voltage for each color is substantially equal to said reference voltage.

5. In a system for making enlarged color prints from color negatives that includes the combination of an enlarger having a source of white printing light and a projection lens, an enclosed passageway between said source and said lens for passage of light from said source to said lens for projection from the latter, a negative holder in said passageway spaced between said source and said lens for supporting a color negative in a position for transmitting therethrough light from said source to said lens, and color correction filters of cyan, magenta and yellow between said source and said negative for correcting color imbalance in the red, green and blue colors in said negative:
a. a light carrier for conducting a sample of the printing light from the space in said passageway between said color negative, when in said position, and said lens to a discharge point for discharge from said carrier, while permitting the remainder of light rays in said passageway to be projected onto printing paper;
b. a red, green and blue filter supported for movement, in succession, past said discharge point in intercepting relation relative to the rays of light discharged from said point for transmission of said rays therethrough and means connected with said filters for so moviing them;
c. a photomultiplier having a D.C. power supply supported in a position for intercepting the rays of light transmitted through said red, green and blue filters, whereby pulsating D.C. voltages representative of the red, green and blue light rays from said source will be generated;
d. means for amplifying the voltages so generated, and means for segregating the amplified voltages into separate groups respectively representative of the sums of said red, green and blue rays;
e. conductors for conducting the voltages of said groups to separate summing stations, one for each group, and each conductor including a manually actuatable potentiometer and an electronic integrating network for effecting a smooth D.C. voltage at each summing junction of an amplitude proportional to the magnitude of its generative color;
f. a source of fixed voltage of opposite polarity to the voltages of said groups at said summing junctions, and an attenuator for conducting the fixed voltage from said last mentioned source to each of said summing junctions including manually actuatable means for adjusting the voltage from each attenuator to deliver at each summing junction a voltage of an absolute magnitude for providing the correct intensity of printing light for each color in the negative in said holder whereby an error voltage signal will be produced at each summing junction equal to the difference between the two voltages and of the polarity of the larger of the two;
g. electrically actuatable control means respectively automatically actuated by said error voltage signals for modifying the intensity of the enlarging light to produce the correct intensity in said enlarging light for each color.

6. In the combination as defined in claim 5:
h. said cyan, magenta and yellow filters being of graduated saturation and supported for rotation across the rays of light from said source to said negative holder;
i. said control means including a servo-motor connected with each of said cyan, magenta and yellow filters for rotating them in one direction through progressive changes of saturation.

7. In the combination as defined in claim 5:
h. said means for rotating said red, green and blue filters and being connected with the means for segregating said voltages into said groups for synchronous actuation.

8. In the combination as defined in claim 5:
h. said cyan, magenta and yellow filters being stationary and said source of printing light comprising three separate lamps and an electrical circuit connecting the error signal with each lamp; and
i. said control means comprising a controller in each of said circuits for automatically increasing or decreasing the light output of each lamp in inverse proportion to the magnitude of the error signal connected therewith whereby the light output for each lamp will decrease in quantity with an increase in said error signal voltage and will increase in quantity with a decrease in said error voltage until said error signal voltage for each color is substantially equal to said reference voltage.

* * * * *